United States Patent
Dawson et al.

(10) Patent No.: US 10,623,998 B2
(45) Date of Patent: Apr. 14, 2020

(54) PRICE OFFERINGS FOR BANDWIDTH-SHARING AD HOC NETWORKS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1310 days.

(21) Appl. No.: 11/755,782

(22) Filed: May 31, 2007

(65) Prior Publication Data

US 2008/0300890 A1    Dec. 4, 2008

(51) Int. Cl.
| | |
|---|---|
| *G06F 17/00* | (2019.01) |
| *G06G 7/00* | (2006.01) |
| *H04W 28/20* | (2009.01) |
| *H04W 4/24* | (2018.01) |
| *G06Q 30/06* | (2012.01) |
| *H04L 12/14* | (2006.01) |
| *H04W 84/18* | (2009.01) |

(Continued)

(52) U.S. Cl.
CPC .......... *H04W 28/20* (2013.01); *G06Q 30/06* (2013.01); *G06Q 30/0611* (2013.01); *H04L 12/145* (2013.01); *H04L 12/1485* (2013.01); *H04W 4/24* (2013.01); *H04W 84/18* (2013.01)

(58) Field of Classification Search
CPC .......... G06Q 30/0283; G06Q 30/0206; G06Q 40/04; G06Q 30/06; G06Q 30/0611; H04W 28/20; H04W 4/24
USPC ....... 705/1.1, 7.11–7.42, 26.1, 400–418, 307
See application file for complete search history.

(56) References Cited

U.S. PATENT DOCUMENTS

| | | |
|---|---|---|
| 5,390,113 A | 2/1995 | Sampson |
| 5,437,054 A | 7/1995 | Rappaport et al. |

(Continued)

FOREIGN PATENT DOCUMENTS

| | | |
|---|---|---|
| CN | 101051913 A | 10/2007 |
| EP | 0999662 | 5/2005 |

(Continued)

OTHER PUBLICATIONS

Frodigh et al, "Wireless ad hoc networking—The art of networking without a network", Ericsson Review No. 4, 2000, http://people.cs.vt.edu/~hamid/Mobile_Computing/papers/frodigh_ericsson00.pdf, 2000, retrieved Oct. 30, 2018 (Year: 2000).*

(Continued)

*Primary Examiner* — Kevin H Flynn
*Assistant Examiner* — Emmett K. Walsh
(74) *Attorney, Agent, or Firm* — Brian Restauro; Andrew M. Calderon; Roberts Mlotkowski Safran Cole & Calderon, P.C.

(57) ABSTRACT

Methods and systems to establish and execute price offerings among the lenders and borrowers in a bandwidth-sharing ad hoc network for shared bandwidth usage. The method comprises establishing a price offering among a lender and borrower in a bandwidth-sharing ad hoc network for shared bandwidth usage. The method further includes executing the price offering upon acceptance of a lender to the bandwidth-sharing ad hoc network for shared bandwidth usage.

16 Claims, 6 Drawing Sheets

(51) Int. Cl.
*G06Q 10/00* (2012.01)
*G06Q 30/00* (2012.01)

(56) References Cited

U.S. PATENT DOCUMENTS

| | | | |
|---|---|---|---|
| 5,490,201 A | 2/1996 | Moberg et al. | |
| 5,953,338 A | 9/1999 | Ma et al. | |
| 5,959,975 A | 9/1999 | Sofman et al. | |
| 6,006,084 A | 12/1999 | Miller et al. | |
| 6,035,281 A * | 3/2000 | Crosskey et al. | 705/14.69 |
| 6,047,268 A | 4/2000 | Bartoli et al. | |
| 6,253,247 B1 | 6/2001 | Bhaskar et al. | |
| 6,366,907 B1 | 4/2002 | Fanning et al. | |
| 6,396,805 B2 | 5/2002 | Romrell | |
| 6,397,061 B1 | 5/2002 | Jordan et al. | |
| 6,415,271 B1 | 7/2002 | Turk et al. | |
| 6,477,522 B1 | 11/2002 | Young | |
| 6,522,735 B1 * | 2/2003 | Fortman et al. | 379/115.01 |
| 6,653,933 B2 | 11/2003 | Raschke et al. | |
| 6,751,196 B1 | 6/2004 | Hulyalkar et al. | |
| 6,763,248 B1 | 7/2004 | Odamura | |
| 6,810,428 B1 | 10/2004 | Larsen et al. | |
| 6,850,764 B1 | 2/2005 | Patel | |
| 6,879,574 B2 | 4/2005 | Naghian et al. | |
| 6,941,378 B2 | 9/2005 | Apostolopoulos et al. | |
| 6,954,616 B2 | 10/2005 | Liang et al. | |
| 6,954,790 B2 | 10/2005 | Forslöw | |
| 6,961,575 B2 | 11/2005 | Stanforth | |
| 6,975,613 B1 | 12/2005 | Johansson | |
| 6,980,511 B1 | 12/2005 | Li | |
| 6,990,113 B1 | 1/2006 | Wang et al. | |
| 7,016,375 B1 | 3/2006 | Rosenberg et al. | |
| 7,028,096 B1 | 4/2006 | Lee | |
| 7,043,225 B1 | 5/2006 | Patel et al. | |
| 7,058,014 B2 | 6/2006 | Sim | |
| 7,058,387 B2 | 6/2006 | Kumar et al. | |
| 7,065,367 B2 | 6/2006 | Michaelis et al. | |
| 7,075,890 B2 | 7/2006 | Ozer et al. | |
| 7,085,281 B2 | 8/2006 | Thomas et al. | |
| 7,089,301 B1 | 8/2006 | Labio et al. | |
| 7,106,699 B2 | 9/2006 | Barri et al. | |
| 7,130,283 B2 | 10/2006 | Vogel et al. | |
| 7,174,385 B2 | 2/2007 | Li | |
| 7,224,964 B2 | 5/2007 | Souissi et al. | |
| 7,240,015 B1 * | 7/2007 | Karmouch et al. | 705/4 |
| 7,257,632 B2 | 8/2007 | Zhang et al. | |
| 7,277,950 B1 * | 10/2007 | Chapweske | H04L 67/104 709/227 |
| 7,310,641 B2 | 12/2007 | Moore et al. | |
| 7,340,759 B1 | 3/2008 | Rodriguez | |
| 7,346,354 B2 | 3/2008 | Patel | |
| 7,376,747 B2 | 5/2008 | Hartop | |
| 7,401,153 B2 | 7/2008 | Traversat et al. | |
| 7,440,573 B2 | 10/2008 | Lor et al. | |
| 7,447,656 B2 | 11/2008 | Parthasarathy | |
| 7,450,517 B2 | 11/2008 | Cho | |
| 7,450,949 B2 | 11/2008 | Choksi | |
| 7,460,549 B1 | 12/2008 | Cardei et al. | |
| 7,463,890 B2 | 12/2008 | Herz | |
| 7,489,656 B2 | 2/2009 | Guo et al. | |
| 7,530,102 B2 | 5/2009 | Moskowitz | |
| 7,546,342 B2 | 6/2009 | Li et al. | |
| 7,593,333 B2 | 9/2009 | Li et al. | |
| 7,609,748 B2 | 10/2009 | Karlsson | |
| 7,623,524 B2 | 11/2009 | Muthukrishnan et al. | |
| 7,633,908 B1 | 12/2009 | Kwong et al. | |
| 7,724,658 B1 | 5/2010 | Eiriksson et al. | |
| 7,788,133 B2 | 8/2010 | Delenda | |
| 7,817,623 B2 | 10/2010 | Dawson et al. | |
| 7,830,834 B2 | 11/2010 | Das et al. | |
| 7,949,593 B2 | 5/2011 | Norris | |
| 8,249,984 B2 | 8/2012 | Dawson et al. | |
| 8,271,336 B2 | 9/2012 | Mikurak | |
| 8,360,784 B2 | 1/2013 | Cardemon | |
| 8,416,689 B2 | 4/2013 | Davari et al. | |
| 8,446,831 B2 | 5/2013 | Kwan et al. | |
| 8,509,788 B2 | 8/2013 | Natarajan et al. | |
| 9,037,508 B2 | 5/2015 | Dawson et al. | |
| 10,419,360 B2 | 9/2019 | Dawson et al. | |
| 2001/0000777 A1 | 5/2001 | McGregor et al. | |
| 2001/0027484 A1 | 10/2001 | Nishi | |
| 2001/0029182 A1 | 10/2001 | McCann et al. | |
| 2001/0052133 A1 | 12/2001 | Pack et al. | |
| 2001/0053152 A1 | 12/2001 | Sala et al. | |
| 2002/0007328 A1 | 1/2002 | Hisamatsu et al. | |
| 2002/0013767 A1 | 1/2002 | Katz | |
| 2002/0029274 A1 | 3/2002 | Allen | |
| 2002/0046155 A1 | 4/2002 | Mashinsky et al. | |
| 2002/0053033 A1 | 5/2002 | Cooper et al. | |
| 2002/0053082 A1 | 5/2002 | Weaver et al. | |
| 2002/0058499 A1 | 5/2002 | Ortiz | |
| 2002/0061009 A1 | 5/2002 | Sorensen | |
| 2002/0069278 A1 | 6/2002 | Forslöw | |
| 2002/0071477 A1 | 6/2002 | Orava | |
| 2002/0075940 A1 | 6/2002 | Haartsen | |
| 2002/0102987 A1 | 8/2002 | Souisse et al. | |
| 2002/0110110 A1 | 8/2002 | Tiihonen et al. | |
| 2002/0120873 A1 | 8/2002 | Salmivalli | |
| 2002/0122410 A1 | 9/2002 | Kulikov et al. | |
| 2002/0138414 A1 | 9/2002 | Baker, IV | |
| 2002/0141358 A1 | 10/2002 | Requena | |
| 2002/0144266 A1 | 10/2002 | Goldman et al. | |
| 2002/0145978 A1 | 10/2002 | Batsell et al. | |
| 2002/0161891 A1 | 10/2002 | Higuchi et al. | |
| 2002/0161898 A1 * | 10/2002 | Hartop | H04L 69/329 709/227 |
| 2002/0173272 A1 | 11/2002 | Liang et al. | |
| 2002/0178261 A1 | 11/2002 | Chang et al. | |
| 2003/0032433 A1 | 2/2003 | Daniel et al. | |
| 2003/0037033 A1 | 2/2003 | Nyman et al. | |
| 2003/0053493 A1 | 4/2003 | Mobley et al. | |
| 2003/0068975 A1 | 4/2003 | Qiao et al. | |
| 2003/0088529 A1 * | 5/2003 | Klinker | H04L 45/00 706/3 |
| 2003/0101267 A1 | 5/2003 | Thompson et al. | |
| 2003/0117978 A1 | 6/2003 | Haddad | |
| 2003/0120594 A1 | 6/2003 | Shaginaw et al. | |
| 2003/0137976 A1 | 7/2003 | Zhu et al. | |
| 2003/0139180 A1 | 7/2003 | McIntosh et al. | |
| 2003/0139990 A1 | 7/2003 | Greco | |
| 2003/0153338 A1 | 8/2003 | Herz et al. | |
| 2003/0235174 A1 | 12/2003 | Pichna et al. | |
| 2003/0235175 A1 | 12/2003 | Naghian et al. | |
| 2004/0006621 A1 | 1/2004 | Bellinson et al. | |
| 2004/0022224 A1 | 2/2004 | Billhartz | |
| 2004/0029553 A1 | 2/2004 | Cain | |
| 2004/0030649 A1 | 2/2004 | Nelson et al. | |
| 2004/0064351 A1 | 4/2004 | Mikurak | |
| 2004/0078323 A1 | 4/2004 | Johnston et al. | |
| 2004/0098329 A1 | 5/2004 | Tilton | |
| 2004/0100929 A1 | 5/2004 | Garcia-Luna-Aceves | |
| 2004/0128231 A1 | 7/2004 | Morita | |
| 2004/0128262 A1 | 7/2004 | Nafousi | |
| 2004/0156312 A1 | 8/2004 | Salonidis et al. | |
| 2004/0162871 A1 | 8/2004 | Pabla et al. | |
| 2004/0165548 A1 | 8/2004 | Backes | |
| 2004/0185777 A1 | 9/2004 | Bryson | |
| 2004/0192204 A1 * | 9/2004 | Periyalwar et al. | 455/25 |
| 2004/0203820 A1 | 10/2004 | Billhartz | |
| 2004/0203832 A1 | 10/2004 | An | |
| 2004/0221319 A1 | 11/2004 | Zenoni | |
| 2004/0260808 A1 | 12/2004 | Strutt | |
| 2004/0264466 A1 | 12/2004 | Huang | |
| 2005/0025172 A1 | 2/2005 | Frankel | |
| 2005/0036475 A1 | 2/2005 | Nishiyama et al. | |
| 2005/0042999 A1 | 2/2005 | Rappaport | |
| 2005/0063419 A1 | 3/2005 | Schrader et al. | |
| 2005/0080872 A1 | 4/2005 | Davis et al. | |
| 2005/0111418 A1 | 5/2005 | Yang et al. | |
| 2005/0153697 A1 | 7/2005 | Patel | |
| 2005/0153725 A1 | 7/2005 | Naghian et al. | |
| 2005/0157661 A1 | 7/2005 | Cho | |
| 2005/0169209 A1 | 8/2005 | Miu et al. | |
| 2005/0169257 A1 | 8/2005 | Lahetkangas et al. | |

(56) References Cited

U.S. PATENT DOCUMENTS

| | | | |
|---|---|---|---|
| 2005/0193221 | A1 | 9/2005 | Yoneyama |
| 2005/0203834 | A1 | 9/2005 | Prieston |
| 2005/0213503 | A1 | 9/2005 | Guo et al. |
| 2006/0002326 | A1 | 1/2006 | Vesuna |
| 2006/0010031 | A1 | 1/2006 | Higuchi et al. |
| 2006/0034330 | A1 | 2/2006 | Iwamura |
| 2006/0036475 | A1 | 2/2006 | Gilfix et al. |
| 2006/0036518 | A1 | 2/2006 | O'Neill |
| 2006/0059261 | A1 | 3/2006 | Finkenzeller et al. |
| 2006/0085543 | A1 | 4/2006 | Hrastar et al. |
| 2006/0095582 | A1 | 5/2006 | Nitya et al. |
| 2006/0109787 | A1 | 5/2006 | Strutt et al. |
| 2006/0114853 | A1 | 6/2006 | Hasty et al. |
| 2006/0126504 | A1 | 6/2006 | Meier et al. |
| 2006/0167784 | A1 | 7/2006 | Hoffberg |
| 2006/0176829 | A1 | 8/2006 | McLaughlin et al. |
| 2006/0179143 | A1 | 8/2006 | Walker et al. |
| 2006/0187858 | A1 | 8/2006 | Kenichi et al. |
| 2006/0193295 | A1 | 8/2006 | White et al. |
| 2006/0205408 | A1 | 9/2006 | Nakagawa et al. |
| 2006/0224502 | A1 | 10/2006 | McGowan |
| 2006/0233377 | A1 | 10/2006 | Chang et al. |
| 2006/0265508 | A1 | 11/2006 | Angel et al. |
| 2006/0274214 | A1 | 12/2006 | Carro |
| 2006/0294258 | A1 | 12/2006 | Powers-Boyle et al. |
| 2007/0005797 | A1* | 1/2007 | Fontijn et al. ............ 709/238 |
| 2007/0019771 | A1 | 1/2007 | Ambuehl et al. |
| 2007/0117537 | A1 | 5/2007 | Hui et al. |
| 2007/0121539 | A1 | 5/2007 | Kikuchi |
| 2007/0124204 | A1 | 5/2007 | de Boer et al. |
| 2007/0140272 | A1 | 6/2007 | Gulliksson |
| 2007/0206528 | A1 | 9/2007 | Walton et al. |
| 2007/0258359 | A1 | 11/2007 | Ogasawara et al. |
| 2007/0291915 | A1 | 12/2007 | Tseitlin et al. |
| 2007/0297436 | A1 | 12/2007 | Sala et al. |
| 2007/0298764 | A1 | 12/2007 | Clayton |
| 2008/0008140 | A1 | 1/2008 | Forssell |
| 2008/0040481 | A1* | 2/2008 | Joshi et al. ............ 709/226 |
| 2008/0104202 | A1 | 5/2008 | Barrett et al. |
| 2008/0165701 | A1 | 7/2008 | Ananthanarayanan et al. |
| 2008/0167982 | A1 | 7/2008 | Leo et al. |
| 2008/0204448 | A1 | 8/2008 | Dawson et al. |
| 2008/0232334 | A1 | 9/2008 | Das et al. |
| 2008/0281529 | A1 | 11/2008 | Tenenbaum et al. |
| 2008/0298283 | A1 | 12/2008 | Dawson et al. |
| 2008/0298314 | A1 | 12/2008 | Dawson et al. |
| 2008/0301017 | A1 | 12/2008 | Dawson et al. |
| 2009/0323587 | A1 | 12/2009 | Trachewsky et al. |
| 2010/0008221 | A1 | 1/2010 | Hong et al. |
| 2010/0114743 | A1 | 5/2010 | Misraje et al. |
| 2010/0205116 | A1 | 8/2010 | Erlanger |
| 2012/0117252 | A1* | 5/2012 | Vasseur et al. ............ 709/227 |
| 2012/0124178 | A1* | 5/2012 | Sparks ............ 709/219 |
| 2014/0279136 | A1 | 9/2014 | Pacella et al. |

FOREIGN PATENT DOCUMENTS

| | | |
|---|---|---|
| WO | 9915960 | 4/1999 |
| WO | 03037009 | 5/2003 |
| WO | 2004001585 | 12/2003 |
| WO | 2006004628 | 1/2006 |

OTHER PUBLICATIONS

Ziane, Saida; A Swarm Intelligent Scheme for Routing in Mobile Ad hoc Networks; Proceedings of the 2005 Systems Communications (ICW'05) (Year: 2005).*

D. Zhu et al., "QoS Aware Wireless Bandwidth Aggregation (QAWBA) by Integrating Cellular and Ad-hoc Networks."

D. Zhu et al., "Using Cooperative Multiple Paths to Reduce File Download Latency in Cellular Data Networks."

Qui et al.. "Bandwidth in Ad Hoc Networks: A Price-Based Approach," 2003, IEEE, pp. 1-10.

Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.

Office Action dated Jan. 9, 2012 in U.S. Appl. No. 11/755,775.

Office Action dated Oct. 20, 2011 in U.S. Appl. No. 11/755,811.

Final Office Action dated Jan. 26, 2012 in U.S. Appl. No. 11/755,800.

Office Action dated Mar. 7, 2012 in U.S. Appl. No. 11/755,779.

BPAI Decision dated Mar. 14, 2012 in U.S. Appl. No. 11/755,806.

Notice of Allowance dated Apr. 13, 2012 in U.S. Appl. No. 11/755,806.

Final Office Action dated Apr. 12, 2012 in U.S. Appl. No. 11/755,811.

Office Action dated Mar. 3, 2011 in U.S. Appl. No. 11/755,800.

Final Office Action dated Mar. 25, 2011 in U.S. Appl. No. 11/755,786.

Notice of Allowance dated Jun. 26, 2012 in U.S. Appl. No. 11/755,779, 10 pages.

Examiner's Answer dated Aug. 15, 2012 in U.S. Appl. No. 11/755,800, 17 pages.

Office Action dated Jul. 19, 2012 in U.S. Appl. No. 11/755,811, 22 pages.

Final Office Action dated Jul. 13, 2012 in U.S. Appl. No. 11/755,775, 16 pages.

"Ad hoc", http://www.thefreedictionary.com/Ad-hoc, Jul. 3, 2012, pp. 1-2.

Office Action dated Jan. 29, 2013 for U.S. Appl. No. 11/755,811; 28 pages.

Notice of Allowance dated Apr. 17, 2013 for U.S. Appl. No. 11/755,811; 9 pages.

Office Action dated Feb. 4, 2013 for U.S. Appl. No. 13/489,673; 14 pages.

Office Action dated Jul. 21, 2011 in U.S. Appl. No. 11/755,775.

Office Action dated Jul. 26, 2011 in U.S. Appl. No. 11/755,779.

Notice of Allowance dated Jun. 10, 2011 in U.S. Appl. No. 11/755,786.

Office Action dated Aug. 18, 2011 in U.S. Appl. No. 11/755,800.

Office Action dated Oct. 19, 2012 for U.S. Appl. No. 13/489,673; 11 pages.

Office Action dated Dec. 24, 2012 for U.S. Appl. No. 11/755,775; 15 pages.

Final Office Action dated May 17, 2013 for U.S. Appl. No. 11/755,775; 18 pages.

Notice of Allowance dated Aug. 23, 2013 for U.S. Appl. No. 11/755,775; 15 pages.

Office Action dated Dec. 6, 2013 for U.S. Appl. No. 13/611,892; 15 pages.

Office Action dated Mar. 28, 2014 for U.S. Appl. No. 13/595,222; 17 pages.

Office Action dated Apr. 10, 2014 for U.S. Appl. No. 13/611,892; 21 pages.

Final Office Action dated Nov. 17, 2014 in U.S. Appl. No. 13/595,222; 14 pages.

Examiner's Answer dated Oct. 3, 2014 in U.S. Appl. No. 13/611,892; 19 pages.

Office Action dated Dec. 17, 2014 in U.S. Appl. No. 13/946,293; 31 pages.

Notice of Allowance dated Jan. 13, 2015 in U.S. Appl. No. 13/611,892; 9 pages.

Notice of Allowance dated Mar. 31, 2015 in U.S. Appl. No. 13/595,222; 8 pages.

Decision on Appeal dated Aug. 3, 2015, in U.S. Appl. No. 11/755,800; 15 pages.

Office Action dated Oct. 26, 2015, in U.S. Appl. No. 11/755,800; 8 pages.

Notice of Allowance dated Oct. 8 2015, in U.S. Appl. No. 13/946,293; 14 pages.

Office Action dated Sep. 23, 2015, in U.S. Appl. No. 14/747,260; 16 pages.

Office Action dated Jun. 24, 2015 in U.S. Appl. No. 13/946,293; 9 pages.

Final Office Action from U.S. Appl. No. 15/008,910 dated May 31, 2018, 21 pages.

(56) References Cited

OTHER PUBLICATIONS

Office Action in related U.S. Appl. No. 14/619,630 dated Dec. 28, 2018, 20 pages.
Notice of Allowance dated May 8, 2019 in related U.S. Appl. No. 11/755,800, 9 pages.
Notice of Allowance dated Jul. 5, 2019 in related U.S. Appl. No. 15/008,910, 8 pages.
Office Action dated May 30, 2019 in related U.S. Appl. No. 14/619,630, 29 pages.
Office Action dated Apr. 21, 2016, in U.S. Appl. No. 11/755,800; 6 pages.
Office Action dated Jun. 27, 2016, in U.S. Appl. No. 14/674,653; 16 pages.
Office Action dated Aug. 24, 2016, in U.S. Appl. No. 13/489,673; 7 pages.
Notice of Allowance from U.S. Appl. No. 14/674,653 dated Sep. 27, 2016; 9 pages.
Office Action from U.S. Appl. No. 11/755,800 dated Oct. 14, 2016. 9 pages.
Office Action from U.S. Appl. No. 13/489,673 dated Jan. 25, 2017. 9 pages.
Office Action from U.S. Appl. No. 15/008,910 dated Apr. 19, 2017; 10 pages.
Office Action from U.S. Appl. No. 15/008,910 dated Nov. 30, 2017, 8 pages.
Final Office Action dated Nov. 26, 2010 in U.S. Appl. No. 11/755,775.
Notice of Allowance dated Dec. 14, 2010 in U.S. Appl. No. 11/755,776.
Office Action dated Jan. 24, 2011 in U.S. Appl. No. 11/755,779.
Notice of Allowance dated Feb. 14, 2011 in U.S. Appl. No. 11/755,788.
Office Action from U.S. Appl. No. 14/674,653 dated Dec. 17, 2015; 12 pages.
http://academic.safaribooksonline.com/0735614954, Microsoft Computer Directory, 3 pages, cited in U.S. Appl. No. 14/674,653 on Dec. 17, 2015.
http://www.webopedia.com, Search Results: "adhoc network", 2 pages, cited in U.S. Appl. No. 14/674,653 on Dec. 17, 2015.
http://www.webopedia.com, Search Results: "asynchronous network", 2 pages, cited in U.S. Appl. No. 14/674,653 on Dec. 17, 2015.
Notice of Allowance from U.S. Appl. No. 14/147,260 dated Feb. 1, 2016; 7 pages.
Notice of Allowance dated Aug. 25, 2010 in U.S. Appl. No. 11/755,780.
Office Action dated Sep. 14, 2010 in U.S. Appl. No. 11/755,788.
Notice of Allowance dated Oct. 12, 2010 in U.S. Appl. No. 11/755,808.
Office Action dated Oct. 29, 2010 in U.S. Appl. No. 11/755,786.
IEEE 802.22, Wireless RANs, 220 pages, Mar. 2006.
Michelini et al, Spectral Sharing Across 2G-3G Systems, IEEE, 5 pages, 2003.
Das et al, A Structured Channel Borrowing Scheme for Dynamic Load Balancing in Cellular Networks, IEEE, 8 pages, 1997.
Notice of Allowance dated Aug. 27, 2019 in related U.S. Appl. No. 13/489,673, 10 pages.
Notice of Allowance dated Nov. 4, 2019 in related U.S. Appl. No. 15/008,910, 7 pages.
Notice of Allowance dated Sep. 25, 2019 in related U.S. Appl. No. 141619,630, 8 pages.

\* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

PRICE OFFERINGS FOR BANDWIDTH-SHARING AD HOC NETWORKS

CROSS-REFERENCE TO RELATED APPLICATIONS

This application is related to the following copending applications, all of which are incorporated herein by reference in their entireties: Copending application Ser. No. 11/755,808, application Ser. No. 11/755,780, and copending application Ser. No. 11/755,775.

FIELD OF THE INVENTION

The invention generally relates to methods and systems to establish and execute price offerings among the lenders and borrowers in a bandwidth-sharing ad hoc network for shared bandwidth usage.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE of California), Bluetooth® (registered trademark of BLUETOOTH SIG, INC. of Delaware), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

However, unless mechanisms exist to motivate network nodes (and their owners) to lend their excess bandwidth at any given moment, it may be difficult for borrowers to obtain the bandwidth needed for any given download.

Accordingly, there exists a need in the art to overcome the deficiencies and limitations described hereinabove.

SUMMARY OF THE INVENTION

In a first aspect of the invention, a method comprises establishing a price offering among a lender and borrower in a bandwidth-sharing ad hoc network for shared bandwidth usage. The method further includes executing the price offering upon acceptance of a lender to the bandwidth-sharing ad hoc network for shared bandwidth usage.

In another aspect of the invention, a method for managing price offerings in an ad hoc network is provided. The method comprises providing a computer infrastructure being operable to: select one or more lenders in the ad hoc network; establish a price offering for a lender of bandwidth in the ad hoc network to charge to a borrower; and accept the price offering for borrowing the bandwidth in the ad hoc network.

In another aspect of the invention, a computer program product comprising a computer usable medium having readable program code embodied in the medium is provided. The computer program product includes at least one component to: establish a price offering among a lender and borrower in a bandwidth-sharing ad hoc network for shared bandwidth usage; and execute the price offering upon acceptance of a lender to the bandwidth-sharing ad hoc network for shared bandwidth usage.

DETAILED DESCRIPTION OF EMBODIMENTS OF THE INVENTION

The invention generally relates to methods and systems to establish and execute price offerings among lenders and borrowers in a bandwidth-sharing ad hoc network for shared bandwidth usage. The present invention can be implemented in either a peer-to-peer environment or a multiplexed environment. In a multiplexed environment, the multiplexer may be either within the ad hoc network or outside of the ad hoc network.

By implementing the methods and systems of the invention, e.g., methods and systems to establish and execute price offerings among the lenders and borrowers in a bandwidth-sharing ad hoc network for shared bandwidth usage, multiple disparate wireless connections in conjunction with multiple devices using a variety of service providers, for example, can be used to create a single virtual fat pipe for transmission of data over a network. The individuals sharing their current connections, i.e., bandwidth, acting as gateway devices, are "lenders" of bandwidth; whereas, the individuals requiring additional bandwidth are "borrowers". By implementing the systems and methods of the invention, lenders are able to quickly establish, execute, and modify price offerings for bandwidth-sharing ad hoc networks.

System Environment

Figure 1:
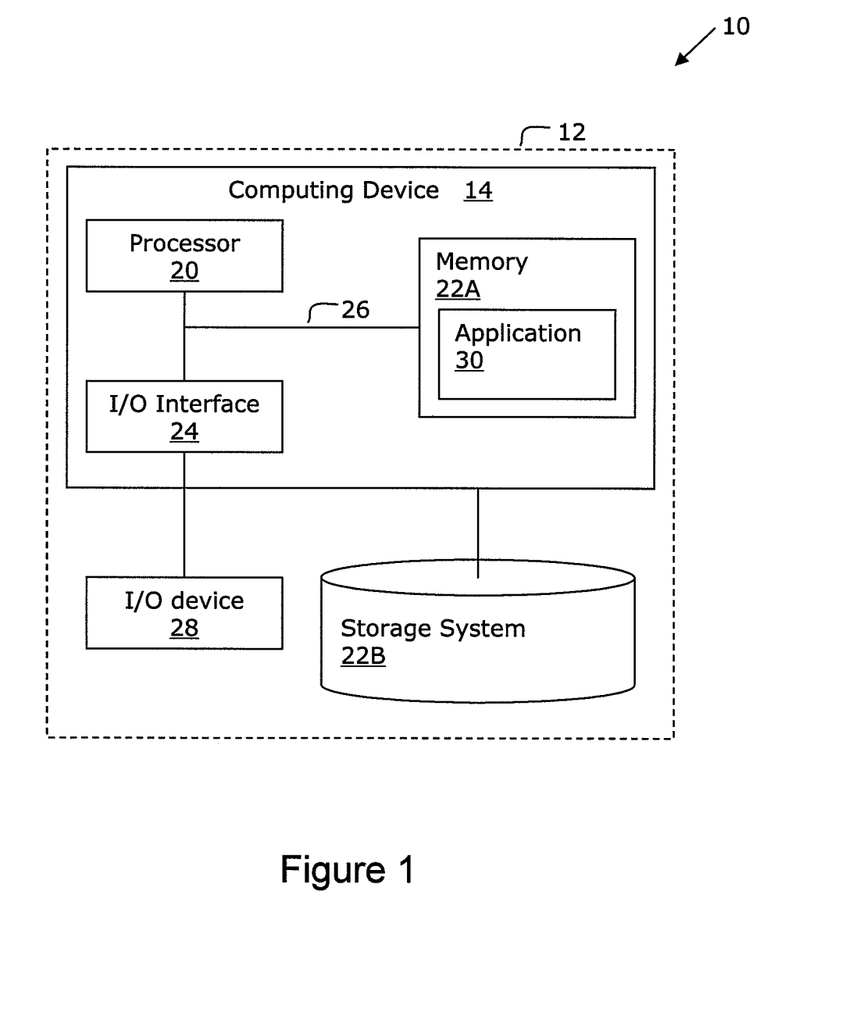
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform the methods and systems to establish and execute price offerings among the lenders and borrowers in a bandwidth-sharing ad hoc network for shared bandwidth usage, in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

By way of example, the service provider may provide price offering options according to the embodiments of the invention, and provide a table or other schema to a potential lender with the calculated price offering options in accordance with different pricing schemes. The table or other schema, for example, can be downloaded on a predetermined basis such as on a daily basis in order for the potential lender to set a price offering in accordance with the preset schemes in response to a borrower's request for bandwidth. In implementation, the service provider would take into consideration any combination of the below described pricing schemes and a combination or all of the factors and provide price offering options based on the different pricing schemes for the lender to select. Additionally, the service provider may provide price offering options that also utilize usage thresholds. In this manner, in embodiments, the service provider facilitates the calculation of a price offering by providing price offering options accounting for the many factors below, and the lender can then select a price offering based on any of the pricing schemes it desires.

General Overview of Ad Hoc Networks

"Ad hoc" relationships are becoming increasingly important in the communal sharing of immediately available resources, and most particularly, the sharing of bandwidth. With the creation of peer-to-peer networks and bit torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example is a 802.11g local area connection that creates a high-speed wireless connection between two cellular phone devices within close range (high bandwidth), and wherein the cellular phones' cellular connection to the outside world may provide bandwidth at less than one percent of the 802.11g connection.

In embodiments of the invention, price offerings for a lender to charge a borrower for shared bandwidth usage in a bandwidth-sharing ad hoc network are determined. In embodiments, a potential lender may determine the price offerings for lending bandwidth to a borrower by selecting a pricing scheme, considering other factors, and, optionally, deciding to utilize a usage threshold.

In order to utilize the price offerings for bandwidth-sharing ad hoc networks, an ad hoc network may be created between a borrower node and one or more lender nodes. This process may include both an initial discovery mechanism of the proposed role each node may play, and a negotiation and acceptance of the agreed price a lender may charge a borrower for lending bandwidth to the borrower.

Figure 2A:
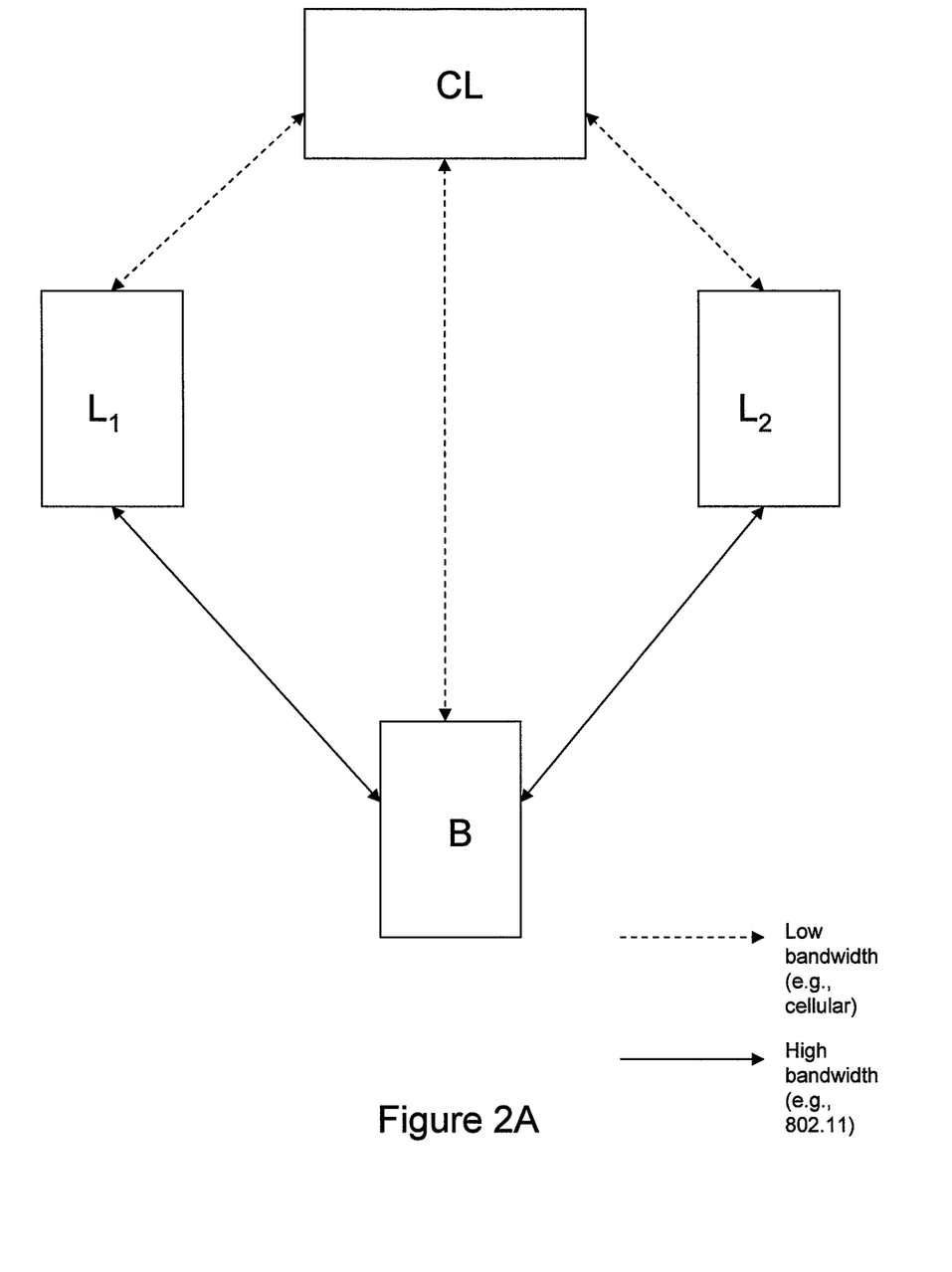
FIG. 2A is an overview of a peer-to-peer ad hoc network.

FIG. 2A is a general overview of a non-multiplexed, peer-to-peer (P2P) bandwidth sharing architecture which may be implemented with the systems and methods of the invention. An illustrative non-multiplexed, peer-to-peer (P2P) bandwidth sharing architecture is set forth in co-pending application Ser. No. 11/755,808.

In this implementation, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
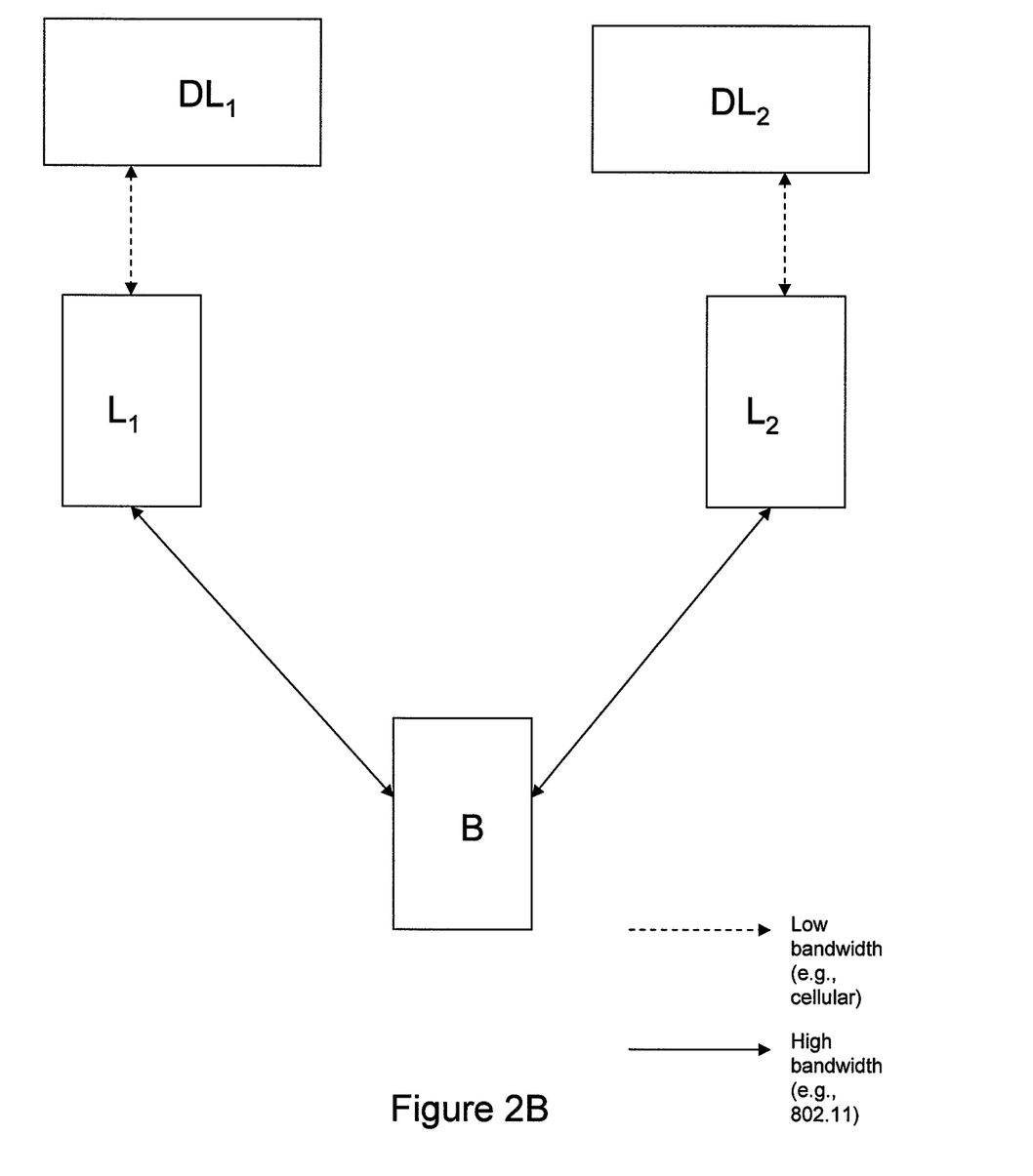
FIG. 2B is an overview of an alternative peer-to-peer ad hoc network.

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 3:
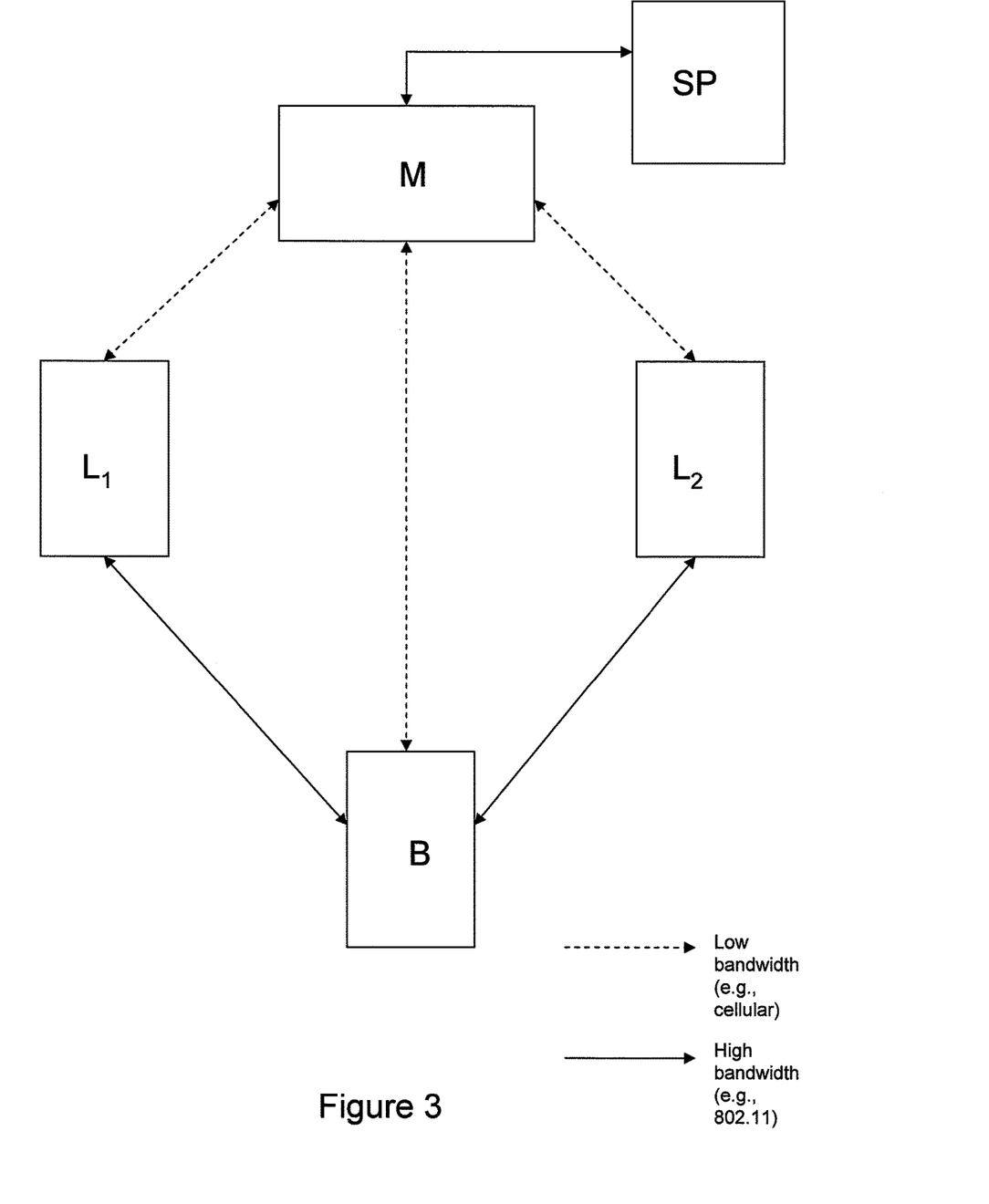
FIG. 3 is an overview of an ad hoc network implementing services of a multiplexer.

FIG. 3 is a general overview of a multiplexed gateway bandwidth sharing architecture which may be implemented with the invention. An illustrative multiplexed, gateway bandwidth sharing architecture is set forth in co-pending application Ser. No. 11/755,780. In this implementation, a borrower B will request a multiplexer M to set up an ad-hoc network. The multiplexer M may communicate with a service provider SP and connect to one or more lenders, L1 and L2, via a wireless network. In this implementation, the borrower may initially broadcast a message for lenders and, upon receipt of a response, transmit the lender locations and other criteria to the multiplexer. Once a network is established, the multiplexer will manage the network, including the bandwidth allocations provided by each of the lenders, for example.

Initial Formation of the Ad Hoc Network

Figure 4:
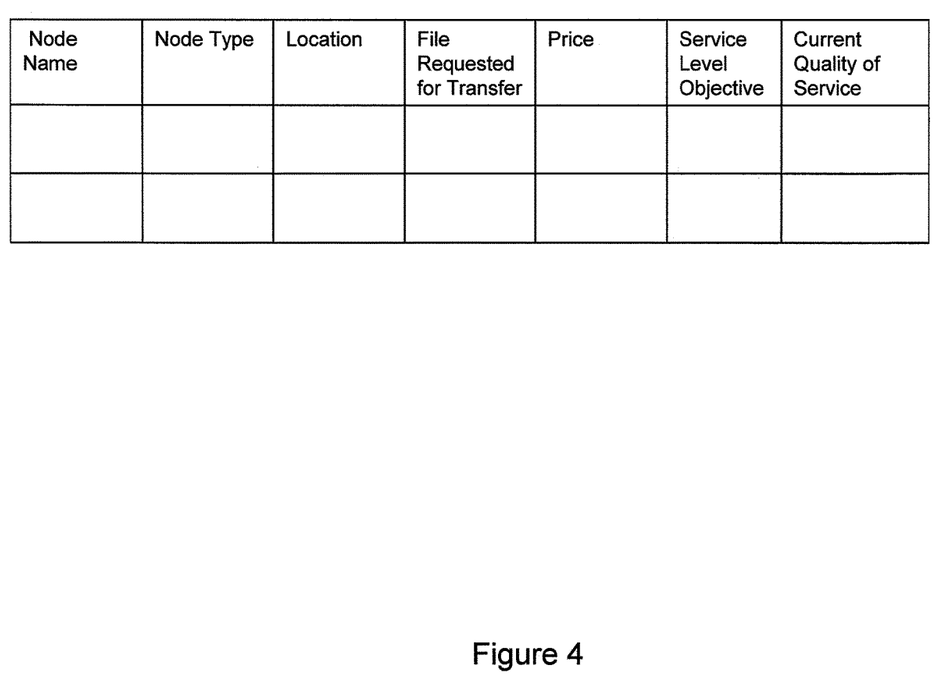
FIG. 4 shows an example table created and used in implementing aspects of the invention.

In order to form a new ad hoc network, a borrower may scan all available potential lenders and prioritize the potential lenders for a data transfer. The formation of the ad hoc network, in embodiments, may use a 'borrower/lender' table as shown in FIG. 4. It is understood the table shown in FIG. 4 is one example of broadcasting bandwidth requests and obtaining lender information to select one or more lenders of bandwidth. For example, the table may take other formats, request additional information, etc. In this example, the borrower or multiplexer will broadcast the table to potential lenders which, in turn, will return the table, with information pertinent to the lender, to the borrower or the multiplexer. Using this information, the borrower or lender can establish an ad hoc network with lenders that meet certain criteria, e.g., reliability, speed, availability and/or costs.

In the borrower/lender table of FIG. 4, the "Node Name" column may be the unique identifier of a node such as the borrower and lenders. For example, this could be a hostname, a Bluetooth® name (Bluetooth are trademarks of Bluetooth Sig, Inc. in the United States, other countries, or both) name or any other information that can uniquely describe the node. The "Node Type" column may describe whether this node is a borrower, a lender, or a multiplexer. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where and how the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally, the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. An illustrative formation and rearrangement of a bandwidth-sharing ad hoc network architecture is set forth in co-pending application Ser. No. 11/755,755.

A borrower completes one line of a new table to describe their node. At this stage, the node name, type, location and file requested columns may be completed. For example, as shown in TABLE 1, Borrower 1 would complete the table showing current location on a Wi-Fi Network called 'Airport', with IP address 192.168.2.3, to download a file from http://location.com/myfile. At this stage, the other columns may remain blank.

TABLE 1

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |

The borrower broadcasts the table to request potential lenders to form an ad hoc network. This broadcast, in embodiments, includes the table for completion by any available nodes within range that could be used to form the ad hoc network. The table may be broadcast over the wireless network using a plurality of different protocols such as Bluetooth®, Wi-Fi or Cellular. The table can be represented in binary, xml, text or other data format optimized for the type of data transport.

A node receives the broadcast, including the table, and a potential lender completes necessary information in the table, including the price information. For example, as shown in TABLE 2, below, Lender 1 is a node on the same Wi-Fi network 'Airport' and is able to perform lender functions for $5/MB at a rate of 1 kb/second. The "File Requested for Transfer" column may remain blank, because the borrower has not yet decided which of the potential lenders will be part of the bandwidth-sharing ad hoc network. Additionally, the "Current Quality of Service" column may remain blank, because no bandwidth sharing has occurred yet.

TABLE 2

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | NA | $5/MB | Can download at 1 kb/sec | NA |

Lender 1 may send back this information, including the pricing information, to Borrower 1. The filling and retransmitting of the table, may be repeated for other potential lenders of bandwidth in the ad hoc network. In this manner, the table may gradually be built up such that borrower can select lenders to use.

For example, as shown below in TABLE 3, additional nodes, Lender 2 and Lender 3, provided the information for each lender, and this information has been tabulated by the borrower, upon receipt. In this example, Lender 2 is on a Bluetooth Network and can download the file requested for transfer at a price of $10/MB and a rate of 2 kb/second. Additionally, Lender 3, is on some other protocol, and can download the file requested for transfer at a price of $10/MB and a rate of 5 kb/second.

TABLE 3

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |

TABLE 3-continued

| Node Name | Node Type | Location | File Requested for Transfer | Price | Service Level Objective | Current Quality of Service |
|---|---|---|---|---|---|---|
| Lender 1 | Lender | Wi-Fi network 'AIRPORT' IP Address: 192.168.2.10 | NA | $5/MB | Can download at 1 kb/sec | NA |
| Lender 2 | Lender | Bluetooth name Pairing key: 1234 | NA | $10/MB | Can download at 2 kb/sec | NA |
| Lender 3 | Lender | Other Protocol 'XXX' Name: 19283 | NA | $10/MB | Can download at 5 kb/sec | NA |

To initiate the download, the borrower may determine, from the information in the table, including the price information, which lenders to use and for which portions of the data. The borrower may borrow bandwidth from the lenders to complete the download.

Price Offerings

As in all of the embodiments, the descriptions of pricing methodologies described herein pertain to both multiplexed and non-multiplexed networks. With price offerings, no consideration is given to the number of potential lenders or borrowers in a given ad hoc network area. Rather, "fixed" or set price offerings may be predetermined, regardless of the numbers of lenders and borrowers in a given ad hoc network. In other words, the borrower would not "play" competing lenders against each other, nor would the lenders be working to ensure the highest prices for their offerings based on the number of borrowers.

In each case, the pricing policy may go into effect once a given mobile device, or node, has "decided" to become a lender, in response to the broadcasted table. The value of each price offering may be included in the wireless negotiations between devices, however, different implementations may be possible.

Price Per Data Volume Offering

With a first pricing scheme, in embodiments, a lender may offer to lend bandwidth for a price per data volume (e.g., cost/megabyte). With this pricing scheme, the lending device may choose to serve multiple clients or just one. Whatever the nature and number of borrowers, the lending device is serving data to the borrower, or borrowers, with a predefined charge per block of data provided. Convenient measures of data volume include kilobytes, megabytes, and/or gigabytes.

Price Per Unit of Time Offering

With a second pricing scheme, in embodiments, a lender may offer to lend bandwidth for a price per unit of time (e.g., cost/hour). With this pricing scheme, regardless of whether a given borrower may be actively using the bandwidth, a "retainer" charge may be imposed for the borrower to have the lender at the ready, such that a lender's bandwidth may always be available when needed. Additionally, with this pricing scheme, a borrower may borrow as much bandwidth as needed during the time period.

Hybrid Offerings

With a third pricing scheme, in embodiments, a lending device may offer to lend bandwidth under a hybrid scheme, in which both a price per data volume and a price per unit of time may be used. In this hybrid scenario, charges may be incurred for both a unit of time during which a lender is willing to lend bandwidth, as well as the specific volume of data downloaded via the lender through the bandwidth-sharing ad hoc network. With this pricing scheme, a low cost retainer "contract" may be put in place so that a borrower may receive high priority services from one or more lenders for a period of time.

As an example of this pricing mechanism, a borrower may engage with a lender, and/or decide that he/she wants to borrow from that lender in the near future. Using this pricing scheme, the lender may charge the borrower a price per unit of time to the lender to ensure that this lender will, for some period of time, lend the borrower bandwidth. Once the bandwidth-sharing is initiated, during the time period, the lender may charge a price per unit of data volume for the bandwidth the borrower used. In this way, in embodiments, a price may be enacted for both the duration of time that the lender is available, and for subsequent downloads undertaken.

In a further implementation, a slight variant on the above described hybrid scheme may be utilized, wherein a lender may charge a price for a unit time with a data volume cap. In this arrangement, a borrower may borrow bandwidth at any point during the time period, and for as long as the time period has not expired, but the borrower may be limited, in the total amount of borrowed bandwidth, by a data volume cap. With this pricing scheme, if a borrower subsequently wishes to go over this data volume cap, then a lender may add additional costs. This additional cost may be a price/data volume scheme, an increased price/time scheme, or a combination of both schemes.

One-Time Charge Offering

With a fourth pricing scheme, in embodiments, a lender may lend bandwidth for a one-time charge, in which a simple payment may ensure that a prospective borrower may take whatever bandwidth is needed as long as borrower and lender are both part of the same ad hoc network with no data volume cap.

Other Factors for Determining Price Offerings

With each of the pricing schemes set forth above, other factors may additionally be considered when determining a price offering for a lender to charge a borrower for borrowing bandwidth. As set forth above, with the price offerings of the present invention, the numbers of relative borrowers and potential lenders in an ad hoc network may still be disregarded.

In considering a first factor, in embodiments, a lender may offer to lend bandwidth based on a price for a given location. For example, location based services (LBS) may be used to ascertain a location, and a unit price offered for that specific location. Alternatively, a lender may manually determine the current location of the ad hoc network, and set a price accordingly. (Alternatively, a service provider may provide the information about the specific location, which can then be downloaded to the lender for pricing information.) This may allow a lender to adjust prices to account for areas, or locations, of generally higher bandwidth-sharing demand. For example, if location is determined to be in an airport, that may tend to have larger numbers of business travelers with mobile devices and a need for bandwidth, then pricing may differ than that in a public park, where a general demand for shared bandwidth may be deemed less. In this way, in embodiments, a current location may be accounted for when determining a price offering for shared bandwidth.

In considering a second factor, in embodiments, a lender may offer to lend bandwidth based on a price for a time of the day. For example, a lender may charge higher prices for expected peak hours, e.g., lunch hour and so forth. This option may permit a lender to customize pricing according to expected periods of high bandwidth-sharing demand. Additionally, a lender may customize pricing based on expected periods of their own high bandwidth needs. For example, a lender may require a large percentage of their available bandwidth for a period of time each day, e.g., 3:00 PM. During this time, a lender may establish a higher price for shared-bandwidth, as bandwidth during this time may be more valuable to the lender. In this way, in embodiments, a current time of day may be accounted for when determining a price offering for shared bandwidth.

In considering a third factor, in embodiments, a lender may offer to lend bandwidth based on a price for day of the week. Analogous to the prior example, pricing for sharing of bandwidth may be adjusted per day, or days, of the week when bandwidth consumption, and thus bandwidth-sharing, is expected to be highest. This may be, for example, either weekdays or weekends, depending on the location being served and the nature of traffic patterns. Additionally, this factor may account for an individual lender's, or others', anticipated bandwidth consumption needs as a function of the day of the week. In this way, in embodiments, a current day of the week may be accounted for when determining a price offering for shared bandwidth.

In considering a fourth factor, in embodiments, a lender may offer to lend bandwidth based on a price given the detection, or lack of detection, of other present networks, or other potential lenders' bandwidth-sharing capacity. For example, if an 802.11b hot spot is present, then a lender with a slower connection, e.g., EV-DO, may accordingly decrease pricing, because if pricing were equal, other mobile devices may elect to go with the faster 802.11b connections. However, if no hot spot is present, then the lender with the EV-DO connection may elect to set a higher price accordingly, because the relative bandwidth advantages of the EV-DO connection. Regardless of the technologies involved, the attractiveness of lending bandwidth may increase, due to an ability to charge increased prices, as the options to get high-speed downloads from the outside world decrease. In this way, in embodiments, a detection of other potential lenders' networks, or lack thereof, may be accounted for when determining a price offering for shared bandwidth.

In considering a fifth factor, in embodiments, a lender may offer to lend bandwidth based on a price in accordance with specified quality of service (QoS) stipulations. QoS stipulations may be dictated by a borrower, as set forth above, by, e.g., filing out the "Service Level Objective" portion of the table. A lender may charge a higher price for bandwidth-sharing if a borrower requires a higher QoS. Conversely, a lender may charge a lower price for bandwidth-sharing, if a borrower only requires a lower QoS. Additionally, a lender may adjust pricing accordingly, if the QoS is higher or lower than the predefined stipulations. Bandwidth-sharing not meeting the QoS stipulations may be indicated through momentary bandwidth-sharing outages, or general connection slowness, such that the overall data throughput over the bandwidth-sharing ad hoc network, over a period of time decreases. If a lender does not meet the QoS stipulations, then the price charged to borrower(s) may be reduced accordingly by the lender, borrower and/or the multiplexing service. In this way, in embodiments, QoS stipulations may be accounted for when determining a price offering for shared bandwidth.

In considering a sixth factor, in embodiments, a lender may offer to lend bandwidth based on a price with a predefined stipulation of availability duration. Availability stipulations may be dictated by a borrower by, for example, filing out the "Service Level Objective" portion of the table. Additionally, availability stipulations may be proactively offered by a potential lender. With this factor, the lender may state that they will continue to serve as a gateway device to the borrower(s) for a prescribed length of time. Because a lender is "guaranteeing" to be available for a period of time, the lender may charge a higher price. A borrower may be willing to pay a higher price for the assurance of the lender's bandwidth availability for the period of time.

As bandwidth-sharing ad hoc networks are dynamic in nature, where mobile devices capable of borrowing and lending bandwidth may be continually joining or leaving an ad hoc network, a "guarantee" of availability may be worth paying a higher price for. If the availability stipulation is not met (e.g., the lender leaves the network or otherwise becomes unavailable), then the cost to borrower(s) may be reduced accordingly by the lender, borrower and/or the multiplexing service. In this way, in embodiments, availability stipulations may be accounted for when determining a price offering for shared bandwidth.

In considering a seventh factor, in embodiments, a lender may offer to lend bandwidth based on a price in accordance with common provider connections. Common provider connections may be defined in several ways. For example, borrowers and lenders being served by the same service provider may establish unit pricing at a cheaper level than would borrowers and lenders being served by different service providers. Additionally, such pricing decisions may also be based upon usage of the same multiplexing service.

In this way, in embodiments, common provider connections may be accounted for when determining a price offering for shared bandwidth.

In considering an eighth factor, in embodiments, a lender may offer to lend bandwidth at prices driven by broader social connections. For example, lenders may be inclined to either lend bandwidth at a lower or higher price based upon a borrower's historical borrowing and lending. A borrower may have a borrowing-to-lending ratio, defined as the amount of bandwidth a borrower has borrowed over a period of time versus the amount of bandwidth that borrower has lent to other borrowers over the period of time. If this ratio is high, e.g., over 1 or other predetermined ratio, a lender may charge a borrower a higher price to lend bandwidth. The higher price may encourage the borrower to lend more bandwidth in the future. In the situation where the ratio is low, e.g., less than 1 or other predetermined ratio, a lender may charge a borrower a lower price to lend bandwidth. The lower price may encourage the borrower to continue to be a good lender of bandwidth in the future, thus promoting broader social connections. In this way, in embodiments, broader social connections may be accounted for when determining a price offering for shared bandwidth.

Usage Thresholds

In addition to the overall pricing scheme and the other factors, a lender may implement usage thresholds in determining a price for lending bandwidth to a borrower in a bandwidth-sharing ad hoc network. A usage threshold may be denoted in varying terms. For example, a usage threshold may be a data volume cap, a data rate cap, a time cap, a percentage of a lender's available bandwidth, or a percentage of a lender's available and unused bandwidth.

With a first usage threshold option, in embodiments, a lender may offer to lend bandwidth up to a "hard" usage threshold, e.g., predetermined usage limit. With this option, the lender may permit borrowers to pay for borrowed bandwidth up to a hard usage threshold, with no opportunity to go beyond this point. Such a hard usage threshold may be stated in absolute terms (e.g., kilobytes per minute) or it may be stated as a percentage of a lender's available bandwidth over an interval of time. Alternatively, this hard usage threshold may be stated in harvested capacity, or unused lender bandwidth, wherein the lender has absolute priority whenever native bandwidth is required, and the borrower is not permitted to take bandwidth beyond this level. As a lender's native bandwidth needs may be dynamic, the hard usage threshold may change. In this way, in embodiments, a hard usage threshold may be used when determining a price offering for shared bandwidth.

With a second usage threshold option, in embodiments, a lender may offer to lend bandwidth up to a "soft" usage threshold. This is similar to the previous scenario, in which the lending device offers bandwidth up to a hard usage threshold, either in absolute or relative terms. However, with this option, a two-tier, or n-tier, system may be introduced where a price exists, e.g., per unit time or data, up to the soft usage threshold limit. Past this soft usage threshold limit, differing price options may be provided. For example, the charge may be 0.04 dollars/megabyte when borrower downloads are in the range of <1 MB/minute, and 0.06 dollars/megabyte when borrower downloads are in the range of 1-2 MB/minute, and 0.08 dollars/minute when borrower downloads are >2 MB/minute. It is understood, while this illustration presumes a time-based pricing, the n-tier system of course may extend likewise to data volume-based pricing.

An n-tier system, in embodiments, may also be implemented based upon a percentage of a lender's available bandwidth. As a lender lends bandwidth, less may be available for the lender's own needs. Thus, a lender may wish to charge a higher price for lending bandwidth as he decreases the bandwidth available for himself. For example, a lender may charge one price to lend the first 60% of his available bandwidth to a borrower, and another, perhaps higher, price to lend the last 40% of his available bandwidth.

Additionally, in embodiments, it is possible to use both a soft usage threshold and a hard usage threshold. For example, a lender may use an n-tier system in conjunction with a hard usage threshold, so that a different price is applicable to n different levels of, e.g., percentage of bandwidth, and a lending of bandwidth cannot exceed a hard usage threshold, e.g., 90% of the lender's available bandwidth.

In addition to a lender charging a price for lending bandwidth, a service provider may charge fees, or a rate $m_1$ for providing the bandwidth sharing feature and/or handling the billing. The service provider may be, for example, a wireless service provider or a multiplexing service provider. In this scenario, using a usage threshold, a lender may calculate a total selling price of shared bandwidth $S_{total}$ according to the following formula:

$$S_{total}=(c_1+m_1)*(\text{minutes of bandwidth used below the soft usage threshold})+(c_2+m_1)*(\text{minutes of bandwidth used above the soft usage threshold}),$$

where:
- $c_1$ is a price per minute (or other unit time) for bandwidth usage that is below the soft usage threshold, as set by the lender,
- $c_2$ is a price per minute (or other unit time) for bandwidth usage that is above the soft usage threshold, as set by the lender,
- $m_1$ is a price per minute (or other unit time) for middleman fees, as set by a service provider.

Additionally, a similar formula may be used with respect to using an n-tier system based upon a percentage of a lender's available bandwidth. In this way, in embodiments, a usage threshold may be used when determining a price offering for shared bandwidth.

Flow Diagram

The steps of the flow diagram described herein may be implemented in the environment of FIG. 1 to provide methods and systems for establishing and executing price offerings for bandwidth-sharing ad hoc networks. In each of the embodiments, described below, a bandwidth sharing agreement may be reached on price for the borrowed bandwidth, and additionally on, e.g., data, quality of service (QoS), and availability durations, between borrowers, lenders and/or multiplexers.

The flow diagram may equally represent a high-level block diagram of the invention. The steps of the flow diagram may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by, or in connection with, a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RNV) and DVD.

Figure 5:
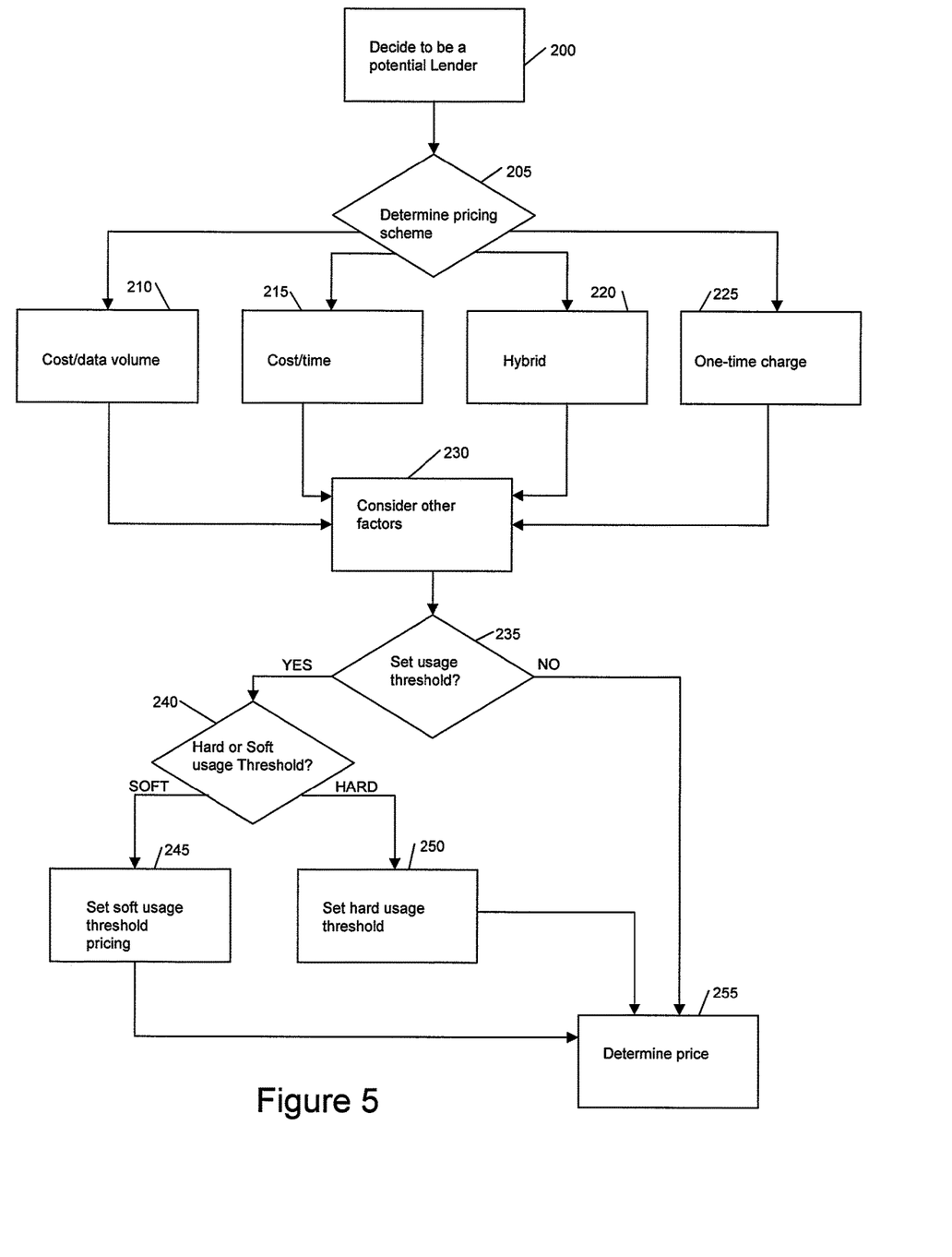
FIG. 5 is a flow chart of steps for implementing aspects of the invention.

FIG. 5 shows a flowchart for the determination of price offering for a lender to charge a borrower for borrowing bandwidth from the lender. FIG. 5 is one illustrative example and should not be considered a limiting embodiment. When initially forming the ad hoc network, a borrower may initiate, or substantiate, the borrower/lender table of FIG. 4.

At step 200, a node decides to be a potential lender. A potential lender may make this determination in response to the borrower's broadcasted table. It is understood that a potential lender is a lender willing to lend bandwidth to the borrower for a price, who has not yet been accepted by the borrower as a lender in the bandwidth-sharing ad hoc network. This acceptance by the borrower may be made after a potential lender determines a price and transmits this information, e.g., in the table, back to the borrower.

At step 205, a potential lender may determine which pricing scheme to use. As set forth above, these pricing schemes may include a cost/data volume, cost/time, hybrid (both cost/data volume and cost/time), and a one-time charge. A potential lender may select one of these pricing schemes at steps 210, 215, 220 or 225, respectively. As described above, selecting to use the hybrid scheme, at step 220, may include selecting to use a cost/time and a cost/data volume scheme, or a cost/time and a data volume cap scheme.

At step 230, a potential lender may consider other factors to determine the price offering. As set forth above, these factors may include: location, time of day, time of week, other potential lenders' networks, QoS stipulations, availability stipulations, common provider, and kudos rating. A potential lender may consider all, or a portion, of these factors when determining a price for sharing bandwidth. Additionally, because some of these factors may cause a price to increase, while others may cause a price to decrease, a potential lender may use a sum, or balancing, of all, or some, of the factors to determine a price offering. At step 235, a potential lender determines whether to set a usage threshold. If a potential lender does not set a usage threshold, the process will proceed to step 255.

As set forth above, the usage threshold may be a hard usage threshold or a soft usage threshold. If at step 235, a potential lender decides to set a usage threshold, at step 240, the potential lender may determine to use a hard usage threshold or soft usage threshold.

If at step 240, the potential lender decides to use a hard usage threshold, at step 250, the potential lender may determine the hard threshold. As set forth above, in embodiments, the hard usage threshold may be, e.g., a total amount of data, a total amount of time, a percentage of available bandwidth, or a percentage of available and unused bandwidth.

If at step 240, the potential lender decides to use a soft usage threshold, at step 245, the potential lender may determine the soft usage threshold. As set forth above, in embodiments, the soft usage threshold pricing may be a two tier, or n-tier, pricing based upon, e.g., total amount of time, per unit of time, per unit of data, a percentage of available bandwidth, or a percentage of available and unused bandwidth.

At step 255, the potential lender will determine a price for lending bandwidth to a borrower in a bandwidth-sharing ad hoc network. The price offering may be based upon the pricing scheme, the other factors and, if utilized, a hard or soft usage threshold.

As set forth above, to initiate a download, a borrower may determine, from the information in the table, including the determined price offering information, sent from potential lenders, which of the potential lenders to use as part of the bandwidth-sharing ad hoc network, and for which portions of the data. The borrower may borrow bandwidth from the lenders to complete the download.

While the invention has been described in terms of embodiments, those skilled in the art will recognize that the invention can be practiced with modifications and in the spirit and scope of the appended claims.

What is claimed is:

1. A method, comprising:
    establishing a bandwidth-sharing ad hoc network for shared bandwidth usage amongst a first computer device and plural second computer devices;
    performing a download of a file using the bandwidth-sharing ad hoc network in which the each of the plural second computer devices use their own bandwidth to download a separate portion of the file from at least one of a central location and a distributed location, on behalf of the first computer device; and
    downloading the respective separate portions of the file to the first computer device from the plural second computer devices,
    wherein the bandwidth-sharing ad hoc network is configured such that the first computer device communicates with the plural second computer devices via local wireless communication protocol and the plural second computer devices communicate with a remote location via wireless telephony protocol to complete the download on behalf of the first computer device to increase the data transfer rate for the first computer device in communicating with the remote location,
    wherein the establishing the bandwidth-sharing ad hoc network comprises:
        the first computer device scanning a plurality of potential second computer devices; and
        the first computer device selecting the plural second computer devices from the plurality of potential second computer devices, based on the scanning, to create a single virtual fat pipe for transmission of data for the first computer device over a network to the remote location,
    wherein the scanning comprises the first computer device requesting bandwidth-sharing information, including a data transfer rate provided by the respective one of the plurality of potential second computer devices, from each of the plurality of potential second computer devices;

wherein the selecting is based on the bandwidth-sharing information received from each of the plurality of potential second computer devices, and wherein the bandwidth-sharing information includes the data transfer rate provided by the respective one of the plurality of potential second computer devices.

2. The method of claim 1, wherein the bandwidth-sharing ad hoc network for shared bandwidth usage is one of a peer-to-peer environment and a multiplexed environment.

3. The method of claim 1, wherein a service provider at least one of creates, maintains, deploys and supports a computer infrastructure that performs the steps of claim 1.

4. The method of claim 1, further comprising the first computer device receiving a price offering from at least one of the plurality of potential second computer devices, wherein:

the price offering is set using predefined factors including at least one of: a given location of the bandwidth-sharing ad hoc network determined using location based services; and the first computer device's historical borrowing and lending;

the price offering is arranged such that a first price applies to data transfer up to a first predefined threshold, a second price applies to data transfer between the first predefined threshold and a second predefined threshold, and a third price applies to data transfer above the second predefined threshold;

the second price is greater than the first price; and the third price is greater than the second price.

5. The method of claim 1, wherein the bandwidth-sharing information includes a price offered by the respective one of the plurality of potential second computer devices.

6. The method of claim 5, wherein the price is a price per volume of data.

7. The method of claim 5, wherein the price is a price per unit of time.

8. The method of claim 5, wherein the price is a combination of a price per volume of data and a price per unit of time.

9. The method of claim 1, wherein the establishing the bandwidth-sharing ad hoc network comprises:

receiving, by the first computer device, user input defining a file requested for download;

automatically generating, by the first computer device, the borrower/lender table in response to the receiving the user input.

10. A method for managing a bandwidth sharing ad hoc network, comprising:

selecting, by a borrower, plural lenders from a plurality of potential lenders in the bandwidth sharing ad hoc network, wherein the borrower comprises a first computer device and each of the plurality of potential lenders comprises a respective second computer device;

performing a download of a file using the bandwidth-sharing ad hoc network in which the each of the selected lenders lend their own bandwidth to download a separate portion of the file from at least one of a central location and a distributed location, on behalf of the first computer device;

downloading the respective separate portions of the file to the first computer device from the plural second computer devices; and creating a virtual fat pipe to perform the download on behalf of the borrower to increase the data transfer rate for the first computer device in communicating with the remote location by configuring the bandwidth sharing ad hoc network for the borrower communicating with the selected one or more lenders via local wireless communication protocol and the selected one or more lenders communicating with a remote location via wireless telephony protocol, wherein the bandwidth-sharing ad hoc network is established by:

scanning a plurality of potential second computer devices by sending, by the first computer device, a borrower/lender table to the plurality of potential second computer devices requesting information regarding increasing the data transfer rate of the first computer device for communicating with the remote location;

receiving, by the first computer device, the borrower/lender table back from each of the plurality of potential second computer devices; and selecting, by the first computer device, the at least one second computer device from the plurality of potential second computer devices based on information regarding increasing the data rate of the first computer device in the borrower/lender table received back from each of the plurality of potential second computer devices.

11. The method of claim 10, wherein a service provider at least one of creates, maintains, deploys and supports a computer infrastructure that performs the steps of claim 10.

12. The method of claim 10, wherein the establishing of the bandwidth-sharing ad hoc network further comprises:

receiving, by the first computer device, user input defining a file requested for download; and automatically generating, by the first computer device, the borrower/lender table in response to the receiving the user input.

13. The method of claim 10, wherein the bandwidth-sharing ad hoc network for shared bandwidth usage is one of a peer-to-peer environment and a multiplexed environment.

14. A computer program product comprising a non-transitory computer usable storage device having readable program code embodied in the storage device, the computer program product includes at least one component to:

establish a bandwidth-sharing ad hoc network for shared bandwidth usage amongst a borrower and plural lenders, wherein the borrower comprises a first computer device and each of the plural lenders comprises a respective second computer device;

wherein the bandwidth-sharing ad hoc network is configured for the borrower communicating with the plural lenders via local wireless communication protocol and the plural lenders communicating with a remote location via wireless telephony protocol to perform the download on behalf of the borrower to increase the data transfer rate for the first computer device in communicating with the remote location; and the establishing the bandwidth-sharing ad hoc network comprises the borrower receiving a respective price offering and a respective service level from each of the plural lenders, wherein the establishing the bandwidth-sharing ad hoc network further comprises:

the first computer device scanning a plurality of potential second computer devices; and the first computer device selecting plural second computer devices from the plurality of potential second computer devices based on the scanning, wherein the scanning comprises the first computer device requesting bandwidth-sharing information, including a data transfer rate provided by each of the plurality of potential second computer devices, from each of the plurality of potential second computer devices by:
sending, by the first computer device, a borrower/lender table to the plurality of potential second computer devices requesting information regarding increasing the data transfer rate of the first computer device for communicating with the remote location;
receiving, by the first computer device, the borrower/lender table back from each of the plurality of potential second computer devices; and
selecting, by the first computer device, the plural second computer devices from the plurality of potential second computer devices based on information regarding increasing the data rate of the first computer device in the borrower/lender table received back from each of the plurality of potential second computer devices,
wherein the selecting is based on the bandwidth-sharing information received from each of the plurality of potential second computer devices, and
wherein the bandwidth-sharing information includes the data transfer rate provided by the respective one of the plurality of potential second computer devices,
the computer program product further including at least one component to:
perform a download of a file using the bandwidth-sharing ad hoc network in which the each of the selected second computer devices lend their own bandwidth to download a separate portion of the file from at least one of a central location and a distributed location, on behalf of the first computer device; and
download the respective separate portions of the file to the first computer device from the selected second computer devices.

15. The computer program product according to claim 14, wherein the computer program product includes at least one component to:
receive, by the first computer device, user input defining a file requested for download;
automatically generate, by the first computer device, a borrower/lender table in response to the receiving the user input.

16. The computer program product according to claim 15, wherein the computer program product includes at least one component to:
send, by the first computer device, the borrower/lender table to the plurality of potential second computer devices;
receive, by the first computer device, the borrower/lender table back from each of the plurality of potential second computer devices; and
select, by the first computer device, the the plural second computer devices from the plurality of potential second computer devices based on the receiving the borrower/lender table back from each of the plurality of potential second computer devices.

* * * * *